Dec. 13, 1966  T. F. PETERSON  3,290,983
HELICAL PENETRATING FASTENING DEVICE
Filed March 28, 1962  2 Sheets-Sheet 1
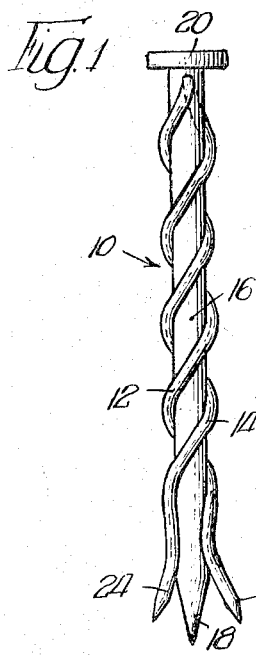
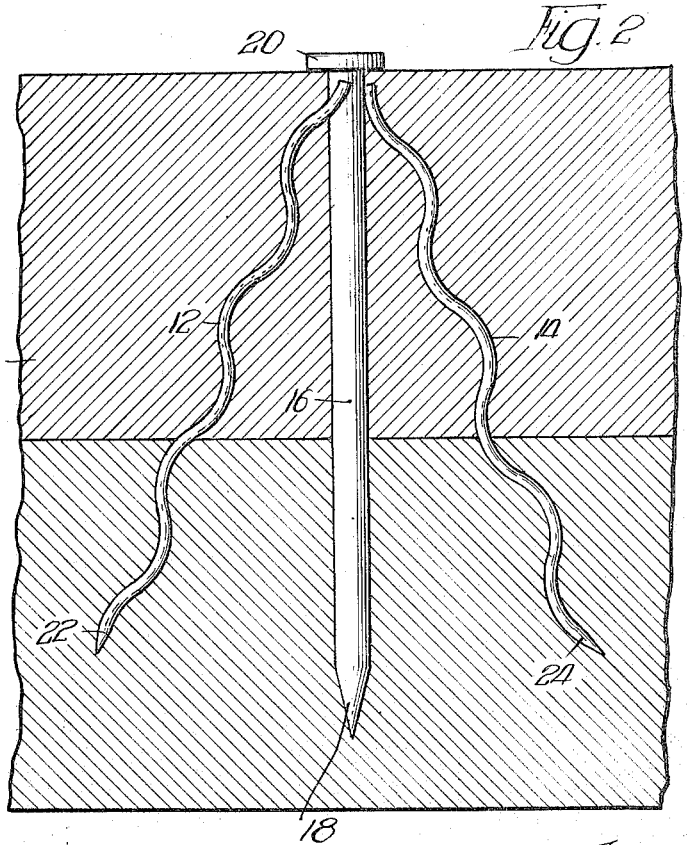
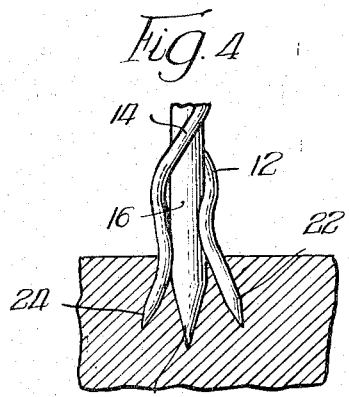
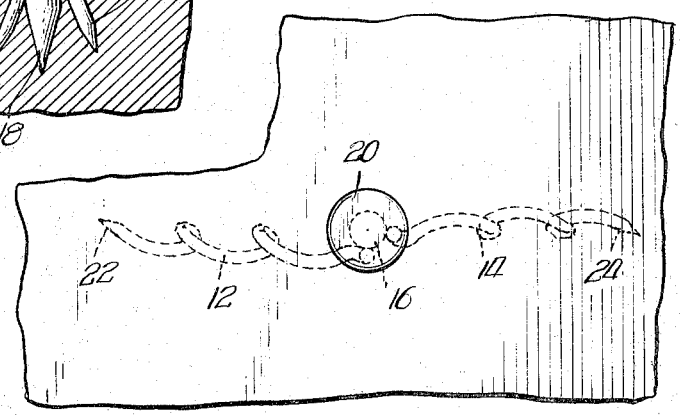
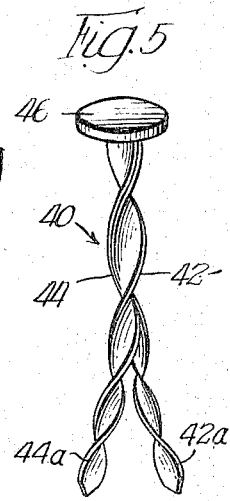
INVENTOR.
Thomas F. Peterson,
BY
Byron, Hume, Groen & Clement
ATTYS

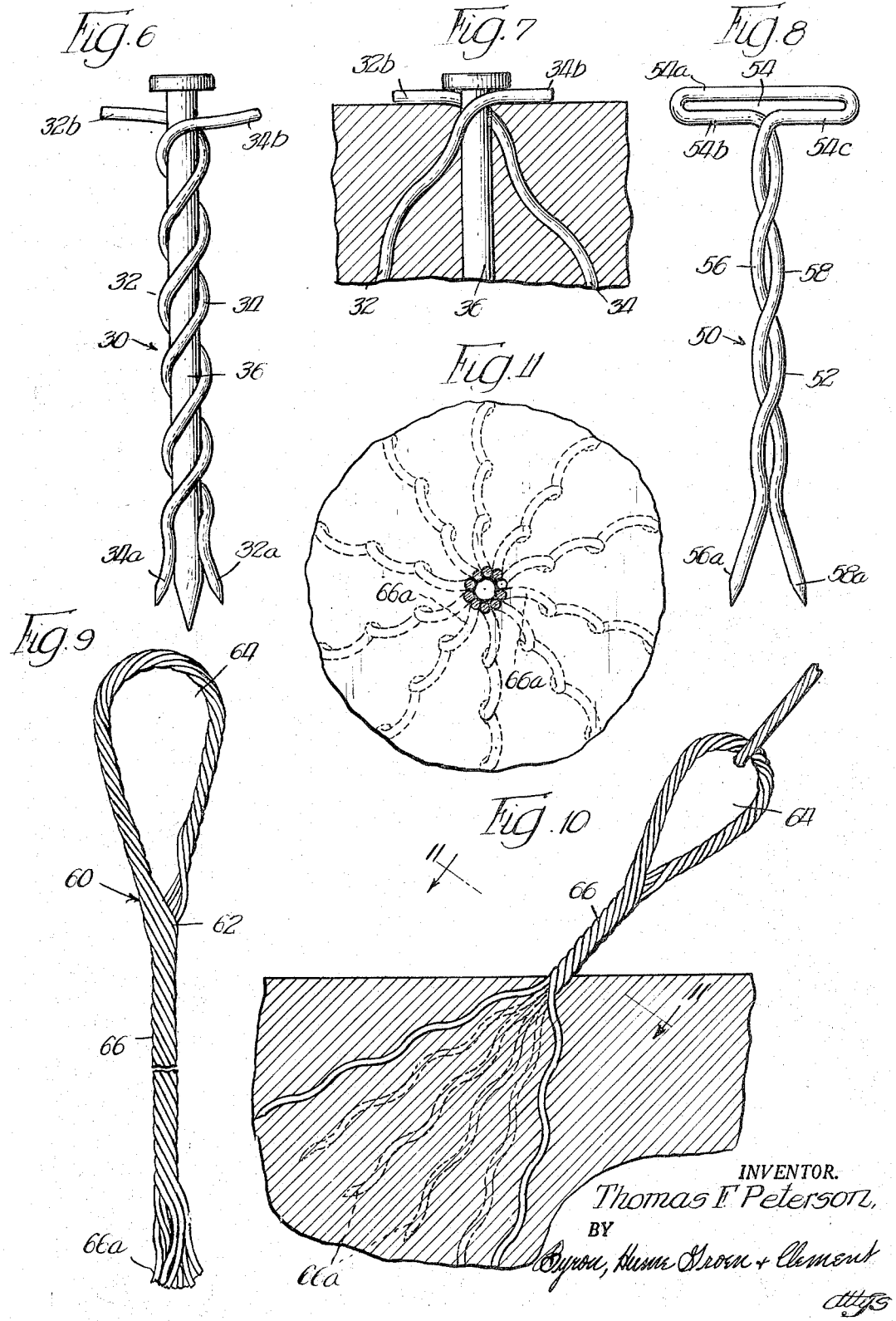

United States Patent Office 3,290,983
Patented Dec. 13, 1966

3,290,983
HELICAL PENETRATING FASTENING DEVICE
Thomas F. Peterson, Shaker Heights, Ohio; John D. Drinko and The Central National Bank of Cleveland, co-executors of said Thomas F. Peterson, deceased
Filed Mar. 28, 1962, Ser. No. 183,193
6 Claims. (Cl. 85—23)

This invention pertains to a fastening and/or anchoring device and in particular to such as device including at least one or more elements which have been helically formed to an open pitch and internal diameter.

The subject invention may be briefly described as being composed of at least one of the aforementioned helically formed elements wound into coaxial relationship with a second helically formed element or the stem of a conventional fastening device such as a nail, brad, screw, bolt or the like. The end of the helically formed element that is adjacent the material piercing end of the second element is positioned so that it projects outwardly from the coaxial axis of the two elements. Thus, when the two elements are forced into piercing engagement of the solid material, the helically formed element enters along an axis displaced from that of the other elements. Continued driving of the fastening device into the material causes the helically formed element to untwist from the other element and to continue to enter along its original axis of engagement. Thus, when the two elements have been driven to the desired extent into the solid material they will lie along diverging axes. In order to remove the two elements from the material it is necessary that a torque as well as an axial force be applied thereto. The torque is necessary in order to retwist the elements into their coaxial engagement as they are withdrawn from the material. This property substantially eliminates the inadvertent removal of the fastening device from the material and serves to lock the two together.

As a result of the helical form and the diverging axes of the two elements any load imparted to the material through the fastening device is distributed over a substantial area or volume of material. Thus, materials which are of relatively low strength may be effectively fastened without the inherent problems of tearing or breaking of the material as a result of the loads imparted to the fastening device.

One group of materials which are particularly susceptible to tearing are building materials composed of a foam or cellular structure. This would include the plastic materials such as foam polystyrene, polyethylene, as well as those materials constructed of the natural fibers such as those used for sound proofing and insulation. Because these materials have a relatively low shear strength and thus are susceptible to tearing it is impractical to permanently fasten them with conventional fasteners such as nails, brads, screws, or the like, particularly when they are under load. This is particularly true where a first layer or body of such material is to be fastened to a second layer or body of similar material. However, the same problems occur, possibly to the same extent, when such material is to be fastened to wood or metal. Specifically, as a result of the low shear strength the cellular materials may be easily pulled or torn from the conventional fastening devices upon being subjected to forces of relatively small magnitude. By distributing the forces over large areas by the use of the fastening device embodying the invention, it is possible to minimize the difficulties normally incurred with such materials.

It will be apparent that the subject fastening device may be utilized with many other materials. One obvious use will be in the construction of ground anchors. Here it is possible to drive the helically formed elements into the ground along diverging axes so that the fastening device is able to sustain loads of large magnitude without being pulled or torn from the earth. In this way it is possible to eliminate the use of a "dead man" and other similar devices that are normally conventionally utilized in the mounting of a ground anchor.

In view of the foregoing, it is a foremost object and feature of the subject invention to provide a fastening device including a helically formed element having an open pitch and internal diameter.

Another object of the invention resides in the provision of a fastening device that is especially adapted for fastening materials having low shear strength.

A still further object of the invention resides in the provision of a fastening device that is particularly adapted to be utilized in the fastening of cellular materials such as the plastic foams, those constructed of natural fibers and the like.

A still further object of the invention resides in the provision of a fastening device that may be utilized in the construction of anchoring devices such as those mounted in the ground.

Still further features and objects of the invention will be apparent upon reading of the specification with reference to the following drawings.

In the drawings:
FIGURE 1 is an elevational view of one fastening device embodying the invention.
FIGURE 2 is a view, partly in section, partly in elevation, of the fastening device as utilized for securing two layers of material together.
FIGURE 3 is a plan view in elevation of the devices shown in FIGURE 2.
FIGURE 4 is a fragmentary view, partly in section, partly in elevation, of the device shown in FIGURE 1 when initially driven into a solid material.
FIGURE 5 is an elevational view of another modification of the fastening device embodying the invention.
FIGURE 6 is an elevational view of another modification of the fastening device embodying the invention.
FIGURE 7 is a fragmentary view, partly in elevation, partly in section, of the modification shown in FIGURE 6.
FIGURE 8 is an elevational view of another embodiment of the invention.
FIGURE 9 is an elevational view of another modification of the invention.
FIGURE 10 is a view, partly in section, partly in elevation, of the FIGURE 9 modification as expanded and inserted into solid material.
FIGURE 11 is a plan view in elevation taken along the lines 11—11 in FIGURE 10.

It will be understood that the various elements utilized in the construction of the fastening device embodying the invention may be fabricated from any suitable material having the properties that will enable it to perform in the manner intended. As will be apparent from the following description, one group of materials that are particularly suitable for the construction of the fastening devices are metals such as steel, copper, brass and the like. Preferably, the elements of the fastening devices should be of a sufficiently rigid construction that will permit them to pierce the material that is to be fastened. However, they may have some resiliency that will permit them to be flexed during the insertion into the material. This resiliency may be the result of the construction, e.g. helical formation, and/or the material from which they are constructed. However, it is to be understood that resilience and rigidity are a matter of design and will vary with the particular use for which the specific fastening device is intended.

Referring now to FIGURE 1, there is shown one form of the fastening device embodying the invention as generally denoted by the numeral 10. The fastening device 10 includes a pair of helically formed elements 12 and 14. The elements 12 and 14 have been formed to a mutually conforming helical pitch length and internal diameter. In the preferred embodiment the pitch length and internal diameter are such that they are of open pitch so that they, in effect, comprise a helical band. As mentioned previously, the helical elements 12 and 14 may be constructed of any suitable material and in this particular embodiment are constructed of round wire or rods. It will be understood, however, as shown in the other embodiments described and disclosed hereinafter, that such configuration is merely by way of example and is not to be considered as a limitation to the scope of the invention. The elements 12 and 14 are wound around a conventional pin type fastening device shown as a nail 16 having a pointed end 18 and the headed end 20. As a result of being wound around the nail 16 the elements 12 and 14 are coaxial therewith for at least a portion of their lengths and are substantially coextensive therewith. Specifically, the upper ends of the elements 12 and 14 are in a closely spaced relationship with the head 20 and, in fact, may be in touching relationship therewith. The other ends of the elements 12 and 14 terminate adjacent or substantially coincident with the pointed end as shown in FIGURE 1.

In the preferred embodiment, the internal diameter of the elements 12 and 14 is substantially the same or slightly less than the external diameter of the nail 16. Thus, when the elements 12 and 14 are wrapped around the nail 16 they are forced to resiliently expand in order to accommodate the diameter of the latter. As a result, the elements 12 and 14 tightly grip the nail 16 so that once they are twisted together they cannot be inadvertently displaced.

The ends 22 and 24 are pointed so as to facilitate piercing of the material to be fastened. In the preferred embodiment, the elements 12 and 14 are unwound for a short portion of their lengths, approximately one-half of a pitch length, adjacent the ends 22 and 24. In this manner, the ends 22 and 24 project outwardly from the axis about which the elements are wound for the remainder of their lengths. As a result of this relationship, when the fastening device 10 is brought into engagement with the material in which it is to be driven, the ends 22 and 24 enter along diverging axes other than that about which the elements 12 and 14 extend for the remaining portion of their lengths, as can be seen in FIGURE 4. As the driving of the fastening device 10 into the material is continued, the ends 22 and 24 continue along the axes of initial entry as can be seen in FIGURE 2. In continuing along such axes, the elements 12 and 14 are forced to unwrap or unwind from the nail 16 so that when the device is completely embedded in the material 26 the elements are completely unwound therefrom. The unwinding of the elements 12 and 14 will exert a torque on the nail 16 which will either cause the former to slip with regard to the latter or cause the latter to turn upon its own axis.

It will be understood that although the axes along which the elements 12 and 14 ultimately lie are shown as being substantially straight, in some cases such axes will be curved or other than straight. The ultimate configuration of the axes will depend upon various factors, i.e., the nature of the material, the initial angle of entry with respect to the common axis, and the characteristics of the helical elements.

It should be kept in mind that, in certain instances, the internal diameter of the helices may be equal to, or greater than, the diameter of the nail. In such case, the helical elements could freely unwind from this nail while the fastening device is being driven.

The driving of the fastening device may be accomplished by any suitable combination of forces that will produce rotation and/or pressing. Such forces may be generated in any manner desired such as by impact and/or torque generating devices either manually or mechanically operated. For example, as repeated blows are made on the head 20 of the nail 16, it will engage the upper ends of the elements 12 and 14 so as, in turn, to drive them into the solid material 26. Of course, in certain materials that are of relatively low strength, the fastening device may be screwed into the material by torque alone, with only nominal force being applied along the axis.

When the fastening device 10 is completely embedded in the material, it can be seen that the elements 12 and 14 lie along diverging axes with respect to each other and the nail 16. Thus, any attempt to tear or separate the layer of material 26 from layer 28 would cause a force to be generated on the layers through the elements 12, 14, and 16. However, such force would be distributed over a relatively large area and volume of material, due to the divergency between their respective axes and the helical construction of elements 12 and 14. Thus, even if the materials were of a relatively low shear strength, considerable force would be needed before there would be any tearing or otherwise separation of the two layers of material. Furthermore, the elements 12 and 14, due to their helical configurations, prevent the slipping of the material with respect to their axes as would occur with the nail 16 alone.

It can thus be seen that the embodiment of the invention shown in FIGURES 1 through 4 provides a relatively simple but very effective fastening device. The fastening device may be used with most materials but it is particularly adapted with those that have relatively low strengths especially in shear. It is to be understood that the construction of the elements 12 and 14 will vary somewhat with the properties of the materials which are to be used. For example, when the material is of relatively hard nature, it is apparent that the elements 12 and 14 must be of sufficient rigidity in order that they may be driven without bending or permanent deformation. However, these are matters of design and are not to be considered as limitations to the scope of the invention.

It will be further understood that, although two helical elements are shown, such is not a limitation but only by way of example. Specifically, a single element may be used in combination with the nail as well as a plurality greater than two.

Referring now to FIGURES 6 and 7 there is shown a second embodiment of the invention which is similar to that described with respect to FIGURES 1 through 4. In this embodiment, the fastening device 30 is constructed of the helically formed elements 32 and 34 which are coaxial with a pin type element 36 for at least a substantial portion of their lengths. The ends 32a and 34a of the elements 32 and 34 are pointed for purposes of facilitating driving into the material to be fastened and have been unwound for a short length from the element 36. The primary difference between the subject embodiment and that previously described is that the elements 32 and 34 have been bent at their upper ends to form the right angle portions 32b and 34b. Thus, when the fastening device is driven into the solid sheet the ends 34 lie on the surface of the same as shown in FIGURE 7. In other respects the subject embodiment is substantially identical with that previously described.

Referring now to FIGURE 5 there is shown a third embodiment of the invention, which is generally denoted by the numeral 40. This embodiment consists of two bands 42 and 44 which have been helically formed to an open pitch about their own axes. The bands 42 and 44 are secured together at their upper ends by a cap 46 in a conventional fashion. As shown in the drawing, the two bands 42 and 44 are intertwisted for a substantial portion of their lengths. The ends 42a and 44a have been untwisted for a short length and are pointed to facilitate driving into a sheet of material.

When the fastening device 40 is initially inserted into the material the ends 42a and 44a enter along diverging axes with respect to each other and the axis of the coaxially intertwisted portions. As the driving of the fastening device 40 is continued, the ends continue along the axes of entry, and are forced to unwind from each other in doing such. When the fastening device 40 is completely embedded in the material, the bands 42 and 44 lie completely along the diverging axes and are completely untwisted. As a result of this relationship, the fastening device 40 provides a fastener which will withstand a maximum of force even in materials of relatively low shear strength.

In FIGURE 8 there is shown a fourth embodiment of the invention generally denoted by the numeral 50. In this embodiment the fastener 50 is constructed of a single wirelike element 52, which is bent intermediate its ends to form the bight 54 as defined by the sections 54a, b, and c. The arrangement of the bight forming sections defines a generally winglike structure which may be used to facilitate the insertion of the device 50 into the material to be fastened.

The return bent portions 56 and 58 have been helically formed to a mutually conforming open pitch and diameter. For a substantial portion of their lengths, the return bent portions 56 and 58 have been intertwisted so that their helical axes coincide. In this particular embodiment the portions 56 and 58 are arranged in opposing relationship with respect to each other. The ends 56a and 58a have been sharpened and are untwisted for a short portion of their lengths.

As set forth previously, the insertion of the fastening device causes the ends to enter along diverging helical axes and to continue along the same until fully untwisted. In this embodiment the insertion of the fastening device 50 may be accomplished in some instances by simply twisting or screwing the same into the material. However, the combination of twisting and driving may be utilized where necessary.

Referring now to FIGURES 9, 10, and 11, there is shown a still further embodiment of the invention as generally denoted by the numeral 60. In this embodiment the fastening device 60 is composed of a plurality of wirelike elements 62 which have been return bent intermediate their ends to form the bight 64. The elements 62 have been helically formed for at least portions of their lengths and particularly the return bent portions 66. The return bent portions are of a mutually conforming open pitch and internal diameter in order that they may be twisted together to form a self-sustaining tubular construction as can be seen in FIGURES 9 through 11. The ends 66a have been untwisted from the coaxial relationship as can be seen in FIGURE 9 and are sharpened so as to facilitate the insertion of the same into the solid material. Thus, as the ends are inserted they enter along diverging helical axes and continued driving of the same to cause them to diverge from the axis of coaxiality, as shown in FIGURES 10 and 11. The insertion of the elements 66 causes them to unwind from each other and in doing so causes the bight and intertwisted portions to rotate. As explained previously, the divergency of the elements 66 after having been inserted, causes them to form a mechanical interlock with the solid material whereby they cannot be readily withdrawn therefrom. Only by permitting the exposed portion to rotate whereby the inserted portions may be rewound into their coaxial relationship can the device be withdrawn unless there is a tearing of the material. In this embodiment the fastening device may be rendered fixed with regard to rotation whereby it cannot be inadvertently withdrawn. For example, if the device is to be utilized as a ground anchor, the bight 64 may be engaged by a suitable attaching means such as a guy wire or whatever is to be fixed. The guy wire will limit the extent of the rotation so that the inserted portions of the elements cannot be removed.

In FIGURES 9 and 10 the elements 62 are shown as being twisted closed throughout the bight 64. It will be understood that such is merely by way of example and that they may constitute a band of open pitch where desired.

It will be understood that the ground anchor or any of the other embodiments may be used in conjunction with a slug of material such as concrete where it is necessary to supplement the "holding power" of the material in which it is embedded. In such a case, a suitable cavity could be made in the ground and then filled with concrete. The untwisted helices would then be inserted therein and the concrete allowed to harden.

It can now be seen that the subject invention provides a new and unique fastening device that provides the features and objects recited previously. Although certain specific embodiments have been shown and described hereinbefore, it will be understood that this is merely by way of example and in no manner to be considered a limitation. It will be apparent that certain modifications may be made within the scope of the claims without departing from the spirit of the invention.

What is claimed is:

1. A penetrating fastening device comprising a plurality of penetrating elements at least one of said penetrating elements being helically formed to an open pitch length and internal diameter, said penetrating elements being disposed for portions of their lengths along a common axis, a relatively short portion of the length of said helically formed penetrating element adjacent its forward end being formed outwardly along a helix axis divergent from said common axis such that the piercing of a solid material by said fastening device causes said helically formed penetrating element to enter along an axis other than said common axis and where continued driving of said plurality of penetrating elements into said solid material will cause said helically formed element to untwist from the remaining elements and to continue to enter along said other axis.

2. A penetrating fastening device as defined in claim 1 wherein approximately one-half pitch length of said helically formed penetrating element adjacent its forward end is formed outwardly along said helix axis divergent from said common axis.

3. A penetrating fastening device as defined in claim 1 wherein another one of said plurality of penetrating elements is a pin type fastening element about which said helically formed element is wrapped for the portion of its length along said common axis.

4. A penetrating fastening device as defined in claim 3 wherein said helically formed element is further defined as being a resilient element preshaped prior to wrapping about said pin type fastening element to an unstressed internal diameter less than the diameter of said pin type fastening element such that said helically formed element resiliently expands when wrapped about said pin type fastening element so as to exert a centripetal gripping force on said pin type fastening element.

5. A penetrating fastening device defined in claim 1 wherein said helically formed element is further defined as being return bent intermediate its ends to provide a pair of substantially coterminal return bent legs, said return bent legs being intertwisted for portions of their lengths along said common axis and formed outwardly for relatively short portions of their lengths adjacent their ends along helix axes divergent from said common axis.

6. A penetrating fastening device as defined in claim 1 wherein said plurality of penetrating elements comprise a half lay of helically formed elements having substantially identical pitch lengths and internal diameters, said helically formed elements being return bent intermediate their ends and intertwisted in opposing phase relationship for portions of their lengths along said common axis so as to form a self-sustaining tubular envelope for the distance they are intertwisted, said helically formed elements further being formed outwardly for relatively short portions of their lengths adjacent their ends along helix axes divergent from said common axis.

References Cited by the Examiner

UNITED STATES PATENTS

| 273,887 | 3/1883 | Petrequin | 52—157 |
| 2,447,444 | 8/1948 | Waite | 52—157 |
| 2,560,643 | 7/1951 | Hallock | 85—13 |
| 3,133,378 | 5/1954 | Poupitch | 52—363 |

FRANK L. ABBOTT, *Primary Examiner.*

RICHARD W. COOKE, JR., *Examiner.*

R. S. VERMUT, *Assistant Examiner.*